(12) United States Patent
Purcell

(10) Patent No.: US 7,659,500 B2
(45) Date of Patent: Feb. 9, 2010

(54) COLUMN CURRENT SOURCE

(75) Inventor: Matthew Purcell, Edinburgh (GB)

(73) Assignee: STMicroelectronics (Research & Development) Limited, Marlow-Buckinghamshire (GB)

(*) Notice: Subject to any disclaimer, the term of this patent is extended or adjusted under 35 U.S.C. 154(b) by 37 days.

(21) Appl. No.: 11/965,970

(22) Filed: Dec. 28, 2007

(65) Prior Publication Data

US 2008/0210848 A1 Sep. 4, 2008

(30) Foreign Application Priority Data

Jan. 2, 2007 (EP) .................... 07100006

(51) Int. Cl.
*H01L 27/00* (2006.01)
*H01J 40/14* (2006.01)
*H03K 17/78* (2006.01)
*H04N 3/14* (2006.01)
*H01L 31/062* (2006.01)

(52) U.S. Cl. .............. 250/208.1; 250/214 R; 250/214 SW; 348/308; 257/291

(58) Field of Classification Search .......... 250/208.1, 250/214 R, 214.1, 214 A, 214 SW, 214 LS, 250/214 LA, 208.4, 239; 348/257, 300, 302, 348/304, 307–309; 257/433, 443, 444, 553, 257/608; 327/53, 66, 132
See application file for complete search history.

(56) References Cited

U.S. PATENT DOCUMENTS

| | | | | |
|---|---|---|---|---|
| 6,437,309 | B1* | 8/2002 | Kozuka et al. | 250/214 R |
| 6,897,429 | B1 | 5/2005 | Turner et al. | 250/214 |
| 2002/0057355 | A1* | 5/2002 | Sakuragi | 348/308 |

FOREIGN PATENT DOCUMENTS

| | | |
|---|---|---|
| EP | 1 596 578 | 11/2005 |
| JP | 5207374 | 8/1993 |

* cited by examiner

*Primary Examiner*—Georgia Y Epps
*Assistant Examiner*—Don Williams
(74) *Attorney, Agent, or Firm*—Lisa K. Jorgenson; Allen, Dyer, Doppelt, Milbrath & Gilchrist, P.A.

(57) ABSTRACT

A column current source for an image sensor includes an array of pixels arranged in rows and columns, a reference current source, a transistor connected as a source follower to the reference current source and forming one half of a current mirror, and a plurality of current sources each connected to a column of pixels and with each current source forming the other half of the current mirror, thereby mirroring the reference current source. The current sources are connected to a first common node. A resistor is connected between the first common node and a second common node. One or more resistors are connected in series between the second common node and the transistor drain, and two or more switches are selectively operable to short circuit the resistors allowing the current sources to provide more than two current levels, thereby optimizing the image sensor current consumption for mobile devices.

24 Claims, 3 Drawing Sheets

COLUMN CURRENT SOURCE

FIELD OF THE INVENTION

The present invention relates to a column current source for an image sensor, and, in particular, but not exclusively, for reducing or minimizing the current usage of a column current source for an image sensor.

BACKGROUND OF THE INVENTION

Image sensors traditionally are made up of an array of light sensitive pixels. The image sensor read-out the value of each pixel to produce an image. Before the array of pixels is exposed to receive light, each pixel is reset. As shown in prior art FIG. 1, a current column source ICOL is provided for each column to bias the pixels PIX of that column and, as such, reset their values.

Each column current source ICOL is one half of a current mirror circuit. A diode-connected transistor MPIAS makes up the other half of the current mirror and is common to each column current source ICOL. The current ICOLBIAS is mirrored at ICOL<1> to ICOL<col>. The current column source ICOL is not required continuously during an imaging cycle, but only when the pixel values are to be reset for integration and readout.

Consequently, to reduce power consumption the circuit comprises two reference currents in parallel 11 and 12. A switch SW is provided for selectively connecting the reference current 12. When the current sources are required the switch is closed and ICOLBIAS is equal to the sum of the two reference currents 11, 12. When the current sources are not required, the switch SW is opened and ICOLBIAS is equal to the reference current 11.

When switching between values of ICOLBIAS there is an inherent lag associated with powering up and down of the array due to the associated parasitic capacitance of the array. It may take 5 ms or longer to switch between values of ICOLBIAS. As pixel arrays get larger the parasitic capacitance increases, and the time to switch between values of ICOLBIAS increases further.

As such, as shown in prior art FIG. 2, which relates to European Patent Application 4,252,834, a single current source is used in combination with a resistive load to provide two levels of reference current depending on whether the resistive load is short-circuited or not. In FIG. 2 a plurality of column current sources 10 are shown. Each column current source 10 has common elements being a diode-connected transistor MBIAS and reference current source ICOLBIAS thereby forming a current mirror. A series of resistors MRESLOAD are connected between each current column source 10 and the transistor MBIAS. A switch 13 is connected across the series of resistors MRESLOAD enabling a short across the series of resistors MRESLOAD.

When the column current sources 10 are required the switch 13 is turned on shorting the series of resistors MRESLOAD and allowing the currents ICOL<1> to ICOL<4> to mirror ICOLBIAS. When the column current sources 10 are not required the switch 13 is turned off. The series of resistors MRESLOAD now have a potential difference across them which reduces the gate-source voltage of the transistor MBIAS. As the column current sources 10 and transistor MBIAS form a current mirror, the column current sources 10 mirror the gate-source voltage of MBIAS and therefore the currents ICOL<1> to ICOL<4> are reduced accordingly.

With both of the above arrangements the column current sources are either at a low value or a high value depending on whether the pixel and associated circuitry is in operation or not. In fact, for a 4T pixel, a high value of current is only typically required when the transfer gate transistor has been switched on. At other times, it would be possible to use a medium value current level, which would result in less current being consumed during pixel readout.

SUMMARY OF THE INVENTION

According to a first aspect of the present invention, there is provided an image sensor that may comprise an array of pixels arranged in rows and columns, a reference current source, and a transistor coupled as a source follower to the reference current source and defining one half of a current mirror. The transistor may have a drain.

A plurality of current sources may each be connected to a column of pixels and each current source defining the other half of the current mirror and thereby mirroring the reference current source. A first common node may be coupled to the plurality of current sources. The image sensor may also include a second common node. At least one first resistor may be coupled between the first common node and a second common node. At least one second resistor may be coupled in series between the second common node and the drain of the transistor. A plurality of switches may be selectively operable to short circuit at least one of the at least one first resistor and at the least one second resistor so as to allow more than two levels of current to be provided by the plurality of current sources.

It is traditional to refer to a column current source in an image sensor, but it should be appreciated that the orientation of the image sensor could be rotated without affecting the principal of the invention. There may be one further resistor means or third resistor and two switch means or switches enabling three different levels to be supplied by the plurality of current sources.

The source of the transistor may be connected to the reference current source, and the gate of the transistor may also be connected to the reference current source as well as each of the plurality of current sources. The plurality of current sources may be column transistors.

The first resistor may be an NMOS transistor operating in its linear region. The second resistor may be an NMOS transistor operating in its linear region.

The resistor may comprise a resistive element for each column. Alternatively, the first resistor may be a single resistive element.

Each second resistor may comprise a plurality of resistive elements. Alternatively, each second resistor may be a single resistive element.

The size of the circuit can be reduced by only using one resistive element common to each column current source. For example, a resistive element may comprise a NMOS transistor in its linear region. It is also possible to use a resistive element for each column of the array of pixels.

According to a second aspect there is provided a mobile device comprising an image sensor as described herein. The mobile device may be a mobile phone having a camera including the image sensor.

According to a third aspect, there is provided an optical pointing device comprising an image sensor, as described. The optical pointing device may be an optical mouse.

BRIEF DESCRIPTION OF THE DRAWINGS

Embodiments of the present invention will now be described with reference to the accompanying drawings, in which.

DETAILED DESCRIPTION OF THE PREFERRED EMBODIMENTS

Figure 1:
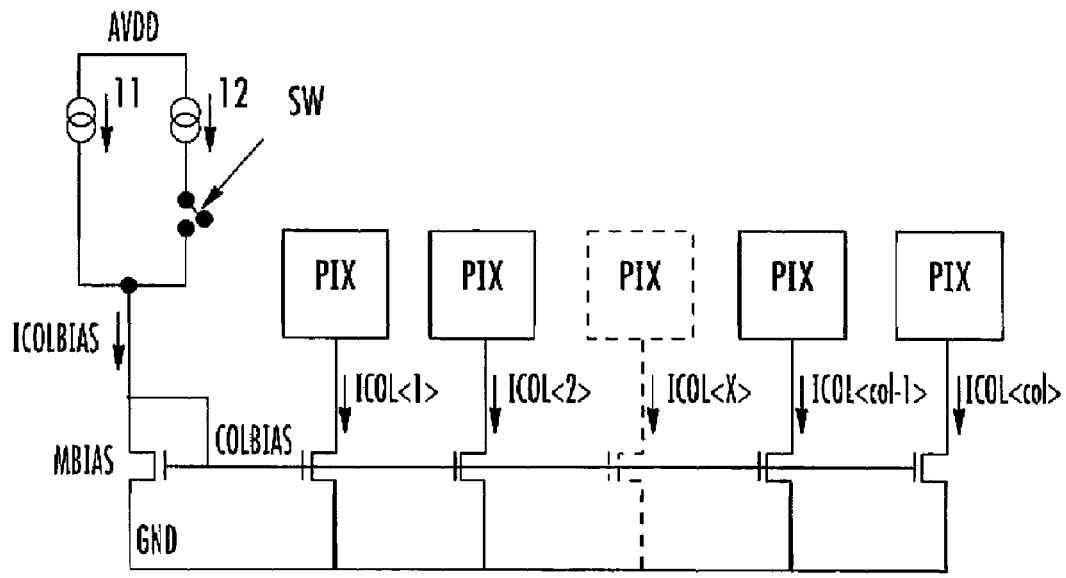
FIG. 1 shows an image sensor having a prior art column current source with two reference current sources.
Figure 2:
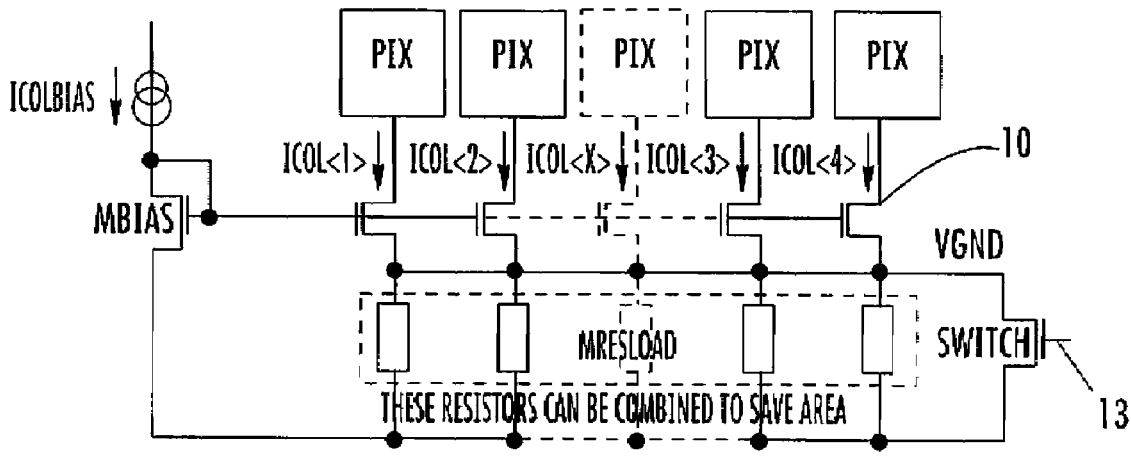
FIG. 2 shows an image sensor having a prior art column current source with one reference current source combined with a resistive load.
Figure 3:
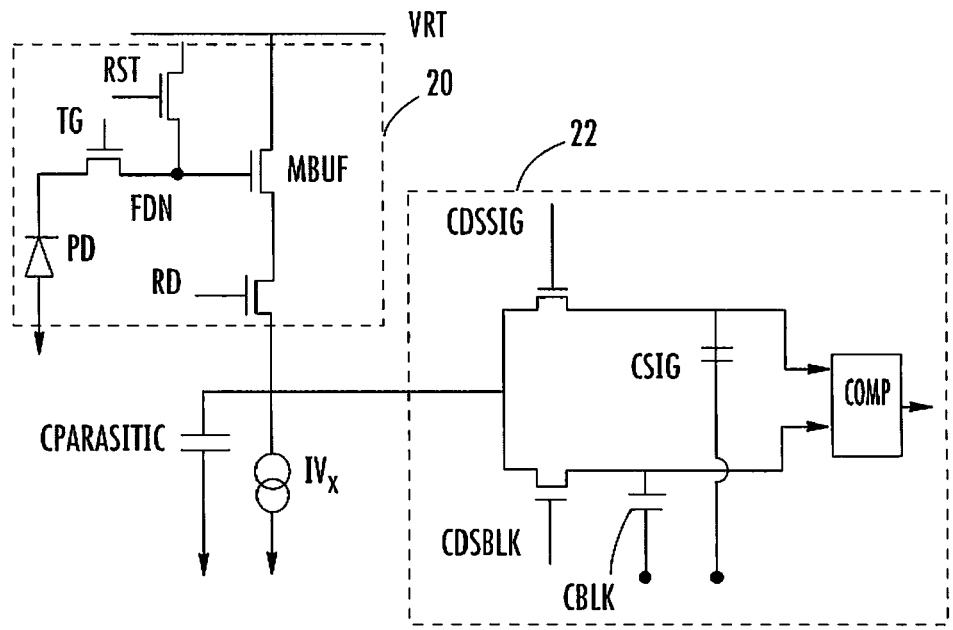
FIG. 3 shows a circuit diagram of a pixel and output circuit for the image sensor according to the invention.

Referring to FIG. 3, a pixel 20 is shown having a photodiode PD, a reset transistor RST, a transfer gate transistor TG, a read transistor RD and a pixel buffer transistor (MBUF), which acts as a source follower. The pixel 20 is part of a pixel array (not shown) and resides in a column of pixels of the pixel array connected in a similar manner between a voltage supply VRT and a column current source $IV_x$. Each column has an associated parasitic capacitance Cparasitic and a readout circuit 22. The readout circuit 22, in this example, comprises a correlated double sample (CDS) arrangement having a signal sample capacitor CSIG, a reset sample capacitor CBLK, a CDS signal transistor CDSSIG, a CDS reset transistor CDSBLK, a comparator COMP. The signal from the comparator COMP would then be available for the remainder of the output circuitry in a known manner.

Figure 4:
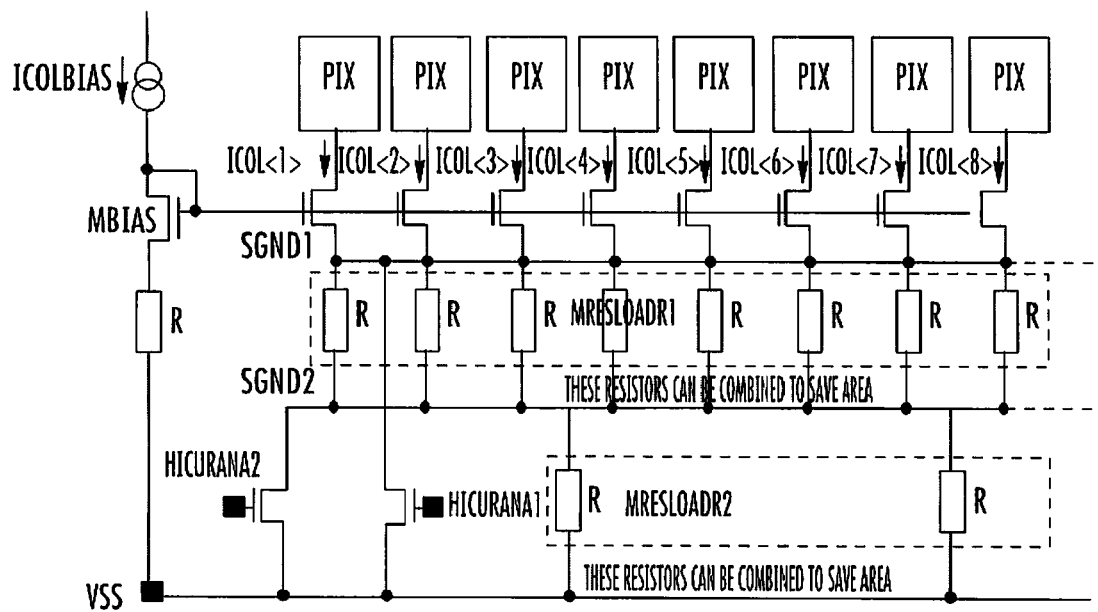
FIG. 4 shows an image sensor having a column current source according to the present invention.

Referring now to FIG. 4, a pixel array having columns of pixels PIX is shown. Only one pixel is shown in each column, but it should be appreciated that, as the diagram is for explanation purposes, that there could be more than one pixel in the column.

Each column has a column current source ICOL<n> (ICOL<n> representing ICOL<1> to ICOL<8>), which is represented by a transistor and is equivalent to the column current source Ivx of FIG. 3. Each column current source ICOL<n> has common elements being a diode-connected transistor MBIAS and reference current source ICOLBIAS thereby forming a current mirror.

A first set of resistors MRESLOAD1 are connected in parallel between a first common node SGND1, which, in this example, is equivalent to ground and is also common to the column current sources ICOL<n>, and a second common node SGND2. A second set of resistors MRESLOAD2 is connected in parallel between the second common node and the diode connected transistor MBIAS, although, in this example, a resistor R is connected between transistor MBIAS and the second set of resistors MRESLOAD2. Although resistor R is not necessary, having it present helps the matching of bias and current sources.

The sets of resistors MRESLOAD1 and MRESLOAD2 may be a single resistive element or a number of resistive elements. Preferably, the resistive elements are NMOS transistors operating in their linear region to emulate a resistor.

A first switch HICURANA1 is connected between the first common node SGND1 and the transistor MBIAS and a second switch HICURANA2 is connected between the second common node SGND2 and the transistor MBIAS. Turning HICURANA1 on thereby short circuits the first set of resistors MRESLOAD1, and turning HICURANA2 on short circuits the second set of resistors MRESLOAD2.

When the column current sources ICOL<n> are required at the highest current level the first switch HICURANA1 is turned on shorting the first and second sets of resistors MRESLOAD1, MRESLOAD2 and allowing the currents ICOL<n> to mirror ICOLBIAS.

When the column current sources ICOL<n> are required at a medium level, the first switch HICURANA1 is turned off and the second switch HICURANA2 is turned on. The first set of resistors MRESLOAD1 now have a potential difference across them which reduces the gate-source voltage of the transistor MBIAS. As the column current sources ICOL<n> and transistor MBIAS form a current mirror, the column current sources ICOL<n> mirror the gate-source voltage of MBIAS and therefore the currents available at ICOL<n> are reduced accordingly. The resistance of the first set of resistors MRESLOAD1 is chosen to only reduce the currents available at ICOL<n> by a predetermined amount.

When the column current sources ICOL<n> are required at a low level, the first and second switches HICURANA1, HICURANA2 are turned off. The first set of resistors MRESLOAD1 and the second set of resistors now have a potential difference across them which reduces the gate-source voltage of the transistor MBIAS even further. As the column current sources ICOL<n> and transistor MBIAS form a current mirror, the column current sources ICOL<n> mirror the gate-source voltage of MBIAS and therefore the currents available at ICOL<n> are reduced accordingly. The resistance of the second set of resistors MRESLOAD2 is chosen to reduce the currents available at ICOL<n> to as low a level as possible.

Figure 5:
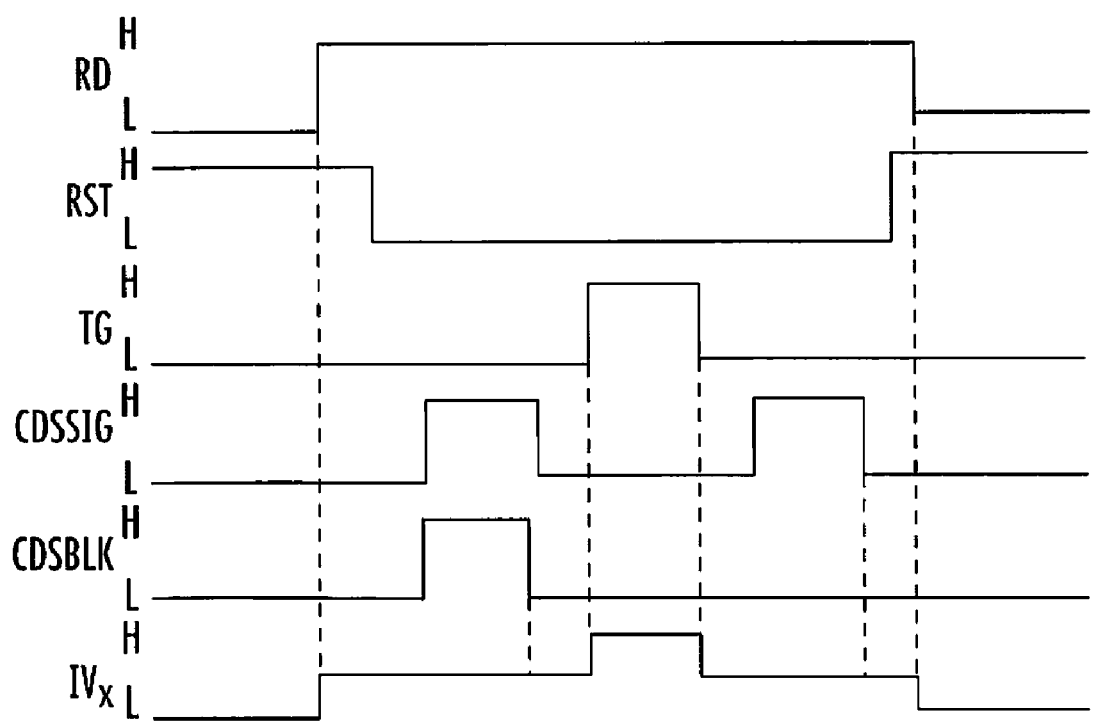
FIG. 5 shows a timing diagram of a pixel, output circuit and column current source according to the present invention.

The effect of the above circuit arrangements will now be described in relation to a timing diagram shown in FIG. 5. The first five signals RD, RST, TG, CDSSIG and CDSBLK represent the on/off operation of the transistors which have like references in FIG. 3. The sixth signal lVx represents the current level available at the current source lVx of FIG. 3, which is equivalent to the column current sources ICOL<n> of FIG. 4.

To begin readout of a pixel, transistor RD is turned on, represented by signal RD going high. Shortly afterwards, transistor RST is turned off, represented by signal RST going low. A value representing the reset state of the pixel is then sampled onto the reset sample capacitor CBLK by pulsing transistors CDSSIG and CDSBLK, which corresponds to the first sample of a CDS process. Information from the photodiode PD is then transferred to node FDN by pulsing transistor TG. The signal at FDN is then sampled onto the signal sample capacitor CSIG by pulsing CDSSIG, which corresponds to the second sample of the CDS process. Shortly afterwards, transistor RST is turned off followed by transistor RD completing the readout sequence.

The pixel buffer MBUF is a source follower and can therefore source current easily but its ability to sink current is limited by the column current source. As such, the current required from the column source is dependent on ensuring that pixel buffer MBUF has settled after a switching operation.

In the case of sampling onto the reset sample capacitor CBLK, only a medium level current is required as reset voltages will be relatively low. In the case of reading out the pixel signal onto node FDN, a higher current is required to ensure a quick discharge.

As such, before pixel readout, current is not required and is set at a low level by turning the first and second switches HICURANA1, HICURANA2 off. When the transistor RD is turned on to begin readout of a pixel, the second switch HICURANA2 is turned on enabling a medium level current supply at the column current source $Iv_x$. The current level is maintained during the first sample of the CDS process. When the transistor TG is turned on a higher current is required and the first and switch HICURANA1 is turned on, enabling a high current level supply at the column current source IV$_x$. The second switch HICURANA2 can be turned off at this point, if desired. When the transistor TG is turned off the high current if no longer required and switch HICURANA1 is turned off. At this point, if not already on, the second switch HICURANA2 is turned on to provide a medium level current supply at the column current source IV$_x$. The second sample of the CDS process is then performed. To minimize fixed pattern noise, the current supply at the column current source IV$_x$ for the second sample in the CDS process should be as close as possible to the current supply for the first sample of the CDS process. Hence, using the medium level current supply given by having switch HICURANA2 on and switch HICURANA1 off. Once the second sample of the CDS process is then performed and transistors RD and RST have been turned off, switch HICURANA2 is turned off setting the current supply to a low level.

The sets of resistors MRESLOAD1 and MRESLOAD2 may be replaced with a single resistance. This allows the footprint of the circuit to be reduced when applied in silicon.

The present embodiments allow the current consumption of a pixel array in an image sensor to be reduced. This is particularly relevant where the image sensor is used in mobile applications, such as a cellular telephone. Improvements and modifications may be incorporated without departing from the scope of the present invention.

That which is claimed:

1. An image sensor comprising:
   an array of pixels arranged in rows and columns;
   a reference current source;
   a transistor coupled as a source follower to said reference current source and defining one half of a current mirror, said transistor having a conduction terminal;
   a plurality of current sources each coupled to a column of pixels and each current source defining the other half of the current mirror and thereby mirroring the reference current source;
   a first common node coupled to said plurality of current sources;
   a second common node;
   at least one first resistor coupled between said first common node and said second common node;
   at least one second resistor coupled in series between said second common node and the conduction terminal of said transistor; and
   a plurality of switches selectively operable to short circuit at least one of the at least one first resistor and the at least one second resistor so as to allow more than two levels of current to be provided by said plurality of current sources.

2. The image sensor according to claim 1, further comprising a third resistor and two switches enabling three different levels to be supplied by the plurality of current sources.

3. The image sensor according to claim 1, wherein said transistor comprises an other conduction terminal and a control terminal, and wherein the other conduction terminal is coupled to said reference current source, and wherein the control terminal is also coupled to the reference current source as well as each of the plurality of current sources.

4. The image sensor according to claim 1, wherein said plurality of current sources comprises column transistors.

5. The image sensor according to claim 1, wherein said at least one first resistor comprises at least one NMOS transistor for operating in its linear region.

6. The image sensor according to claim 1, wherein said at least one second resistor comprises at least one NMOS transistor for operating in its linear region.

7. The image sensor according to claim 1, wherein said at least one first resistor comprises a resistive element for each column.

8. The image sensor according to claim 1, wherein said at least one first resistor comprises a single resistive element.

9. The image sensor according claim 1, wherein said at least one second resistor further comprises a plurality of resistive elements.

10. The image sensor according to claims 1, wherein said at least one second resistor comprises a single resistive element.

11. An electronic device comprising:
    a housing; and
    an image sensor carried by said housing and comprising
       an array of pixels arranged in rows and columns,
       a reference current source,
       a transistor coupled as a source follower to said reference current source and defining one half of a current mirror, said transistor having a conduction terminal,
       a plurality of current sources each coupled to a column of pixels and each current source defining the other half of the current mirror and thereby mirroring the reference current source,
       a first common node coupled to said plurality of current sources,
       a second common node,
       at least one first resistor coupled between said first common node and said second common node,
       at least one second resistor coupled in series between said second common node and the conduction terminal of said transistor, and
       a plurality of switches selectively operable to short circuit at least one of the at least one first resistor and the at least one second resistor so as to allow more than two levels of current to be provided by said plurality of current sources.

12. The electronic device according to claim 11, wherein the electronic device comprises a mobile phone.

13. The electronic device according to claim 11, wherein the electronic device comprises an optical pointing device.

14. The electronic device according to claim 13, wherein the optical pointing device comprises an optical mouse.

15. A method of making an image sensor comprising:
    forming an array of pixels arranged in rows and columns;
    forming a reference current source;
    coupling a transistor as a source follower to the reference current source and defining one half of a current mirror, the transistor having a conduction terminal;
    coupling a plurality of current sources each to a column of pixels and each current source defining the other half of the current mirror to thereby mirror the reference current source;
    coupling a first common node to the plurality of current sources;
    coupling at least one first resistor between the first common node and a second common node;
    coupling at least one second resistor in series between the second common node and the conduction terminal of the transistor; and
    coupling a plurality of switches selectively operable to short circuit at least one of the at least one first resistor and the at least second resistor so as to allow more than two levels of current to be provided by the plurality of current sources.

16. The method according to claim 15, further comprising forming a third resistor and two switches enabling three different levels to be supplied by the plurality of current sources.

17. The method according to claim 15, wherein the transistor comprises an other conduction terminal and a control terminal, and wherein the other conduction terminal is coupled to the reference current source, and wherein the control terminal is also coupled to the reference current source as well as each of the plurality of current sources.

18. The method according claim 15, wherein the plurality of current sources comprises column transistors.

19. The method according to claim 15, wherein the at least one first resistor comprises at least one NMOS transistor for operating in its linear region.

20. The method according to claim 15, wherein the at least one second resistor comprises at least one NMOS transistor for operating in its linear region.

21. The method according to claim 15, wherein the at least one first resistor comprises a resistive element for each column.

22. The method according to claim 15, wherein the at least one first resistor comprises a single resistive element.

23. The method according to claim 15, wherein the at least one second resistor further comprises a plurality of resistive elements.

24. The method according to claim 15, wherein the at least one second resistor comprises a single resistive element.

* * * * *